Patented Aug. 19, 1952

2,607,778

UNITED STATES PATENT OFFICE 2,607,778

PROCESS OF PREPARING N,N-DIMETHYL-N'-(p-CHLOROBENZYL)-N'-(2 - PYRIDYL)-ETHYLENEDIAMINE

Richard F. Phillips, Westfield, and Edith M. Cates, Rahway, N. J., assignors to Merck & Co., Inc., Rahway, N. J., a corporation of New Jersey No Drawing. Application July 22, 1948, Serial No. 40,173

1 Claim. (Cl. 260—296)

This invention relates to the preparation of a new chemical compound N,N-dimethyl-N'-(p-chlorobenzyl) - N' - (2-pyridyl)-ethylenediamine and acid salts thereof, more particularly the hydrochloride salt. It is also concerned with the preparation of a novel chemical compound, 2-(p-chlorobenzylamino)-pyridine, produced as an intermediate in the synthesis of N,N-dimethyl-N'-(p-chlorobenzyl) - N' - (2 - pyridyl)-ethylenediamine.

The new chemical compounds with which our invention is concerned, N,N-dimethyl-N'-(p-chlorobenzyl) - N' - (2 - pyridyl) - ethylenediamine, and the salts thereof, particularly the hydrochloride salt, possess marked and effective anti-histaminic properties.

One of the chief disadvantages encountered in the clinical use of anti-histaminic drugs has been the occurrence of side-effects, of which sedation has been one of the most serious. A method of testing pharmacologically has been discovered in which the potentiating action of an anti-histaminic drug on barbiturate hypnosis in mice has been correlated with the severity of sedation observed in clinical practice. In contrast with known anti-histaminic drugs our new compound does not show significant potentiation of barbiturate hypnosis.

In preparing our novel chemical compounds we utilize as the starting materials, p-chlorobenzaldehyde which has the structural formula

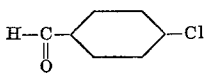

and 2-aminopyridine which may be identified by the following formula

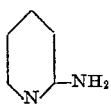

We have found that these two compounds, i. e., p-chlorobenzaldehyde and 2-aminopyridine, may be caused to react by heating them in the presence of formic acid to yield 2-(p-chlorobenzylamino)-pyridine, a compound having the following structural formula:

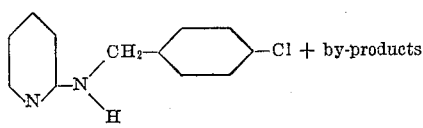

The 2-(p-chlorobenzylamino)-pyridine thus obtained is an impure product containing various by-products.

Purification of this compound may be accomplished by dissolving the crude product in dilute aqueous acid, adding toluene, warming for a short time with agitation, and recovering the separated aqueous layer. After making this aqueous solution alkaline with sodium hydroxide, toluene is added and the mixture stirred for a short time with warming. Thereafter the toluene layer is separated and cooled causing precipitation of crystals of 2 - (p - chlorobenzylamine) - pyridine which are recovered and dried in accordance with conventional procedure.

The purified product, i. e., 2-(p-chlorobenzylamino)-pyridine, is accordingly reacted with β-chloroethyldimethylamine $Cl.CH_2.CH_2.N(CH_3)_2$ in the presence of an inert solvent such as toluene, and an acid binding agent such as sodium hydride. This results in the formation of N,N-dimethyl - N' - (p - chlorobenzyl)-N'-(2-pyridyl)-ethylenediamine, a compound which may be identified by the following formula:

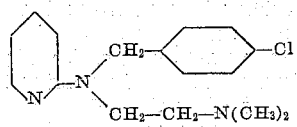

The acid salts of N,N-dimethyl-N'-(p-chlorobenzyl)-N'-(2-pyridyl)-ethylenediamine may be prepared by treating the base, N,N-dimethyl-N'-(p-chlorobenzyl) - N' - (2-pyridyl)-ethylenediamine with one equivalent of acid and recovering the acid salt. Thus for example the corresponding hydrohalide salts are obtained by reacting equimolecular quantities of N,N-dimethyl-N'-(p-chlorobenzyl) - N' - (2-pyridyl)-ethylenediamine and a hydrohalide in a suitable solvent medium such as methanol.

The preparation of our novel compounds possessing a pronounced anti-histaminic property and the novel intermediate chemical compound obtained in the process by which they are secured may be illustrated by the following specific example. It should be noted of course, that this example is intended to be illustrative of the methods and procedures utilized in preparing these compounds and that it is not intended to be restrictive or to be regarded as embodying the only way in which our novel compounds may be formed and recovered.

*Example*

A mixture of 56.2 grams of p-chlorobenzaldehyde, 37.6 grams of 2-aminopyridine and 99 grams of 98–100% formic acid was heated at the reflux temperature for eight hours. The mixture was then cooled and 200 ml. of water was added. Sufficient hydrochloric acid was added to this reaction mixture to adjust the pH to 2 and the solution was extracted with ether. The aqueous solution was then alkalized with sodium hydroxide, thus precipitating an oil which soon solidified. The crude 2-(p-chlorobenzylamino)-pyridine thus precipitated was collected by filtration.

The crude product was purified by stirring it with 200 ml. of water and adding sufficient sulfuric acid to adjust the pH of the solution to 2. To the acid solution was added 100 ml. of toluene, and the mixture was stirred at 60–65° for fifteen minutes. The toluene layer was withdrawn and discarded. The operation was repeated on the aqueous layer. The aqueous solution was then adjusted to pH 9 with 30% sodium hydroxide solution, and then 20% in excess of the amount of sodium hydroxide required for the pH adjustment was added to the alkaline solution also. 200 ml. of toluene was then added and the mixture was stirred at 60–70° C. for one hour. The aqueous and toluene layers were separated and the operation was repeated using a fresh portion of toluene. Upon cooling 2-(p-chlorobenzylamino)-pyridine crystallized from the toluene extracts. The crystals thus obtained melted at approximately 100–101° C.

Anal.—Calcd. for $C_{12}H_{11}N_2Cl$: C, 65.90; H, 5.07; N, 12.81. Found: C, 65.65; H, 4.87; N, 12.71.

A mixture of 25.4 grams of purified 2-(p-chlorobenzyl)-amino)-pyridine, 4.8 grams of sodium hydride and 400 ml. of toluene was heated at the reflux temperature while stirring. After 30 minutes a solution of β-chloroethyldimethylamine was introduced into the reaction mixture dropwise. (The β-chloroethyldimethylamine solution was prepared by treating a solution of 20.9 grams of β-chloroethyldimethylamine hydrochloride with an excess of 20% sodium hydroxide solution while cooling with ice, extracting with toluene and drying the toluene extract with anhydrous potassium carbonate.) The reaction mixture was heated at reflux temperature for three hours after the addition of β-chloroethyldimethylamine was complete. After cooling, the mixture was filtered and the filtrate distilled. N,N-dimethyl-N'-(p-chlorobenzyl)-N'-(2-pyridyl)-ethylenediamine was collected as an oil boiling at approximately 150-160°/0.1 mm.

The hydrochloride of N,N-dimethyl-N'-(p-chlorobenzyl)-N'-(2-pyridyl)-ethylenediamine was prepared by treating the base with one equivalent of hydrogen chloride. This can be done conveniently by adding the calculated amount of a standardized solution of hydrogen chloride in methanol to a solution of the base in methanol and precipitating the hydrochloride of N,N-dimethyl-N'-(p-chlorobenzyl)-N'-(2-pyridyl)-ethylenediamine by the addition of ether. Upon crystallization from acetone these crystals melted at approximately 170° C.

Anal.—Calcd. for $C_{16}H_{21}N_3Cl_2$: C, 58.90; H, 6.49; N, 12.88. Found: C, 59.16; H, 6.23; N, 12.71.

It should be understood that various changes may be made in our process as herein described without affecting the results attained. Thus, various modifications of conditions as to time, temperature, alkalinity, acidity, etc. and various changes in procedure differing from those herein given as illustrative of the preferred embodiments of our invention may be made without departing from the scope thereof. Accordingly the scope of our invention is to be determined in accordance with the prior art and appended claim.

We claim:

The process which comprises heating a mixture of 2-(p-chlorobenzylamino)-pyridine, sodium hydride and toluene, to reflux temperature while stirring, adding a solution of β-chloroethyldimethylamine in toluene to said mixture, continuing heating at reflux temperature, cooling the reaction mixture, filtering the mixture and distilling the filtrate to recover N,N-dimethyl-N'-(p-chlorobenzyl)-N'-(2-pyridyl)-ethylenediamine.

RICHARD F. PHILLIPS.
EDITH M. CATES.

REFERENCES CITED

The following references are of record in the file of this patent:

UNITED STATES PATENTS

| Number | Name | Date |
|---|---|---|
| 2,502,151 | Horclois | Mar. 28, 1950 |